United States Patent
Schlecht

(10) Patent No.: US 7,189,185 B2
(45) Date of Patent: Mar. 13, 2007

(54) METHOD FOR OPERATING A DRIVE TRAIN IN A MOTOR VEHICLE

(75) Inventor: Martin Schlecht, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/337,228

(22) Filed: Jan. 20, 2006

(65) Prior Publication Data

US 2006/0154779 A1    Jul. 13, 2006

Related U.S. Application Data

(63) Continuation-in-part of application No. PCT/EP2004/008152, filed on Jul. 21, 2004.

(30) Foreign Application Priority Data

Jul. 22, 2003 (DE) ................... 103 33 183

(51) Int. Cl.
*F16H 61/48* (2006.01)
(52) U.S. Cl. .................. 477/54; 477/62; 477/68
(58) Field of Classification Search ................ 477/53, 477/54, 62, 64, 68
See application file for complete search history.

(56) References Cited

U.S. PATENT DOCUMENTS 5,056,380 A * 10/1991 Sawasaki et al. ............. 477/39
5,141,089 A     8/1992 Nobumoto et al.
5,318,159 A     6/1994 Kashiwabara
5,498,217 A *  3/1996 Maruyama et al. ......... 477/169
5,547,437 A *  8/1996 Kamada et al. ............. 477/143
6,799,108 B2 * 9/2004 Aldrich et al. ................ 701/51

FOREIGN PATENT DOCUMENTS

| DE | 39 15 186 | 8/1990 |
| DE | 41 11 081 | 10/1991 |
| DE | 101 47 207 | 4/2002 |
| EP | 0 833 085 | 4/1998 |
| JP | 08 326891 | 12/1996 |

* cited by examiner

*Primary Examiner*—Ha Ho
(74) *Attorney, Agent, or Firm*—Klaus J. Bach

(57) ABSTRACT

In a method for operating a drive train for a motor vehicle including a transmission with a hydraulic torque converter having a converter lockup clutch which can be activated by a working pressure acting on a piston under engine overrun conditions when an increased internal pressure is produced in the torque converter which acts on the piston counteracting the operating pressure of the converter lockup clutch so that it cannot be closed, at least one operational variable of the motor vehicle is monitored and if the operational variable exceeds a threshold value the rotational speed ratio between the turbine wheel and pump wheel is reduced by changing the engine speed and/or the transmission ratio in order to activate the lock-up clutch.

11 Claims, 2 Drawing Sheets

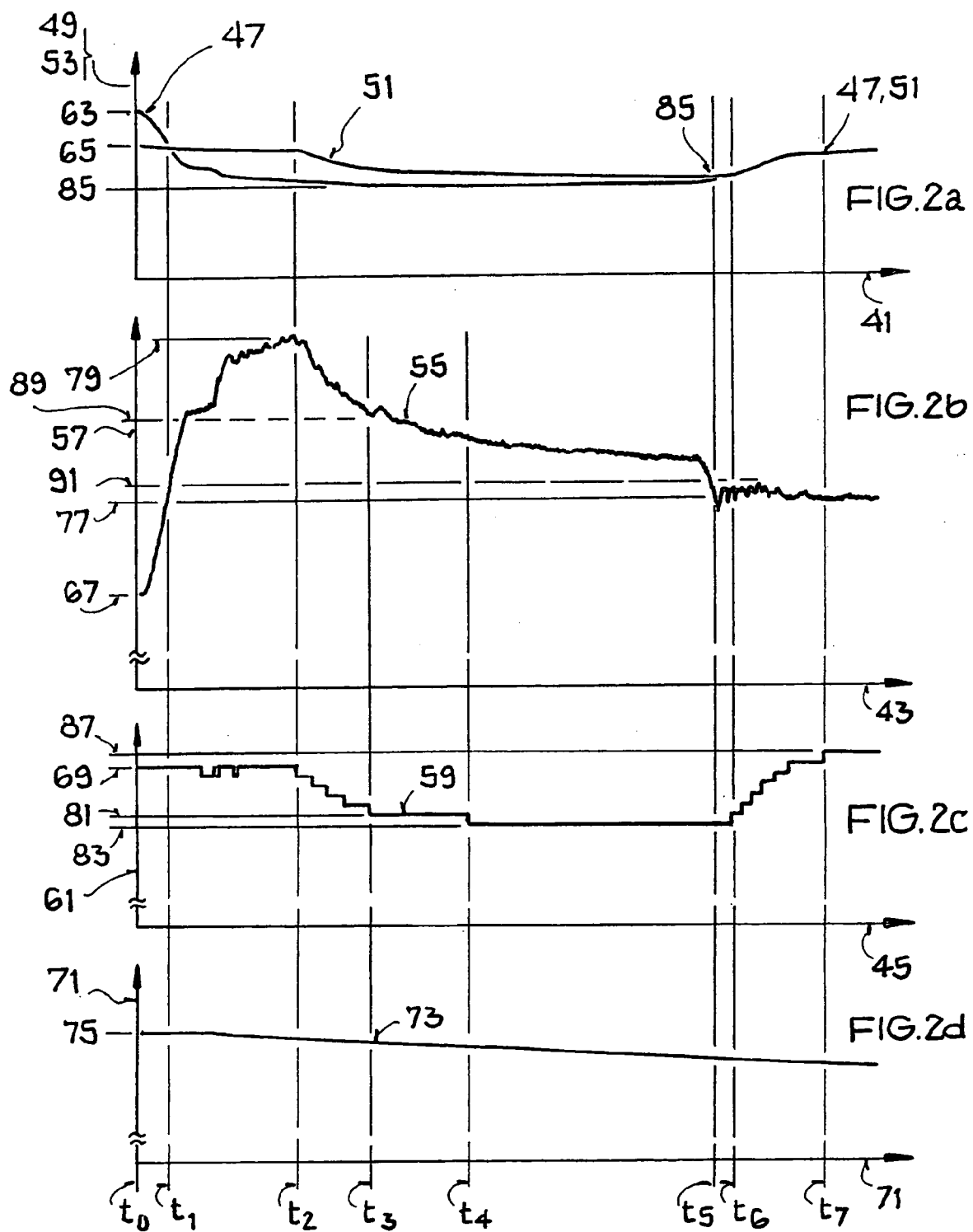

METHOD FOR OPERATING A DRIVE TRAIN IN A MOTOR VEHICLE

This is a Continuation-In-Part Application of International Application PCT/EP2004/008152 filed Jul. 21, 2004 and claiming the priority of German application 103 33 183.3 filed Jul. 22, 2003.

BACKGROUND OF THE INVENTION

The invention relates to a method for operating a drive train for a motor vehicle including a continuously variable transmission and a torque converter with a converter lock-up clutch which can be engaged by the operating pressure of the hydrodynamic torque converter.

A conventional torque converter on which the invention is based, having a converter lockup clutch which can be activated by means of an axial piston, is known, for example, from German patent DE 39 15 186 C1.

In the arrangement disclosed in this publication, the converter lockup clutch which acts between a pump wheel and a turbine wheel can be closed by means of a working pressure acting on a piston. It is, however, disadvantageous that in overrun conditions an increased internal pressure is produced in the torque converter, which also acts on the piston and counteracts the working pressure of the converter lockup clutch so that, in particular in a two-channel torque converter, the precise actuation of a desired working point of the converter lockup clutch is made more difficult. In the worst case, the converter lockup clutch can be closed only partially, or cannot be closed at all. A comparable problem is already discussed, without a specific proposal for a solution, in the document DE 101 47 207 A1.

Furthermore, U.S. Pat. No. 5,141,089 A discloses a method in which the overrun deactivation of the engine during the closing process of the converter lockup clutch is delayed in order to increase the engine speed. This takes place even if the turbine rotational speed is higher than the pump rotational speed, i.e. in overrun conditions.

The Japanese document JP 08 326891 A finally discloses a continuously variable transmission with a torque converter between the engine and transmission. In said document it is described that during the closing process of the converter lockup clutch the turbine rotational speed is changed by means of a change in the transmission ratio in such a way that the decrease in the converter slip is compensated for and the operational variable which is monitored in the process is the converter slip.

It is the principle object of the present invention to provide an improved method with which the converter lockup clutch can be reliably closed in accordance with a predefined setting even in overrun conditions.

SUMMARY OF THE INVENTION

In a method for operating a drive train for a motor vehicle including a transmission with a hydraulic torque converter having a converter lockup clutch which can be activated by a working pressure acting on a piston under engine overrun conditions when an increased internal pressure is produced in the torque converter which acts on the piston counteracting the operating pressure of the converter lockup clutch so that it cannot be closed, at least one operational variable of the motor vehicle is monitored and if the operational variable exceeds a threshold value the rotational speed ratio between the turbine wheel and pump wheel is reduced by changing the engine speed and/or the transmission ratio in order to activate the lock-up clutch.

The transmission ratio, that is, the quotient of the transmission output speed and the transmission input speed, is already present in modern motor vehicles in the transmission control unit and possibly also in the engine control unit so that it does not have to be laboriously measured and transmitted to the control unit. The magnitude and the ratio of the pump wheel rotational speed and turbine wheel rotational speed can be determined from the transmission ratio and other known operating parameters and in a specific torque converter it is possible to determine the internal pressure thereof from these parameters and thus to determine whether the converter lockup clutch can still be closed or whether the engine speed or the transmission ratio or both have to be changed.

An operational variable, i.e. in this case the transmission ratio, can be monitored easily and usually with little expenditure by measuring it. In this context, the operational variable can be measured directly or indirectly by sensing a variable which correlates with the operational variable or by the calculation of the operational variable by means of at least one other variable, in particular while taking into account a parameter field, a characteristic diagram of vehicle operating parameters or ambient parameters.

In order to measure the operational variables of a motor vehicle, cost-effective sensors which are compatible with the requirements and which convert the operational variable into a corresponding electrical variable are provided. The electrical variable can be transmitted easily, without the expenditure for a separate additional cabling system, by means of data bus systems, for example by means of CAN (Controller Area Network) busses, which are already provided in the motor vehicle. The assessment or evaluation of the operational variable or measured variable and the decision about measurements which are to be possibly initiated may be taken in an open-loop and/or closed-loop control unit which is usually already provided.

In reaction to an excessive change in the operational variable or to a threshold value of the operational variable which is to be monitored, it is proposed to change the rotational speed ratio of the pump wheel with respect to the turbine wheel of the torque converter. The invention is based on the realization that the disruptive internal pressure which counteracts the closing pressure of the converter lockup clutch is dependent on the rotational speed ratio of the turbine wheel with respect to the pump wheel.

This measure changes the internal pressure by a change of the rotational speed ratio of the turbine wheel with respect to the pump wheel in such a way that the converter lockup clutch can be engaged about precisely at a predefined deviation. The change in the rotational speed ratio can be brought about by changing the engine speed (pump wheel rotational speed) or changing the transmission ratio (turbine wheel rotational speed).

A trigger criterion or open-loop or closed-loop control variable for changing the rotational speed variable is the at least one operational variable, the transmission ratio being monitored according to the invention indirectly or directly as an operational variable. In this way, the operational variable which is to be monitored is easily returned to a value below the threshold value.

There are only fractions of a second required to measure, transmit and evaluate the measured variable or operational variable, and it is possible to react even when there are very small changes, and the operational variable can be influenced in good time—even before a threshold value is exceeded or when it is exceeded—in such a way that it remains below a limiting value.

This is significant in particular if the converter lockup clutch absolutely has to be closed under overrun conditions since otherwise, under certain circumstances, the motor vehicle undesirably accelerates on a negative gradient.

It is advantageous that in conjunction with the mechanical, in particular continuously variable, transmission the change in the engine speed or the transmission ratio cannot be felt by the vehicle occupants and thus does not lead to any decreases in comfort.

In one embodiment of the invention, the internal pressure in the torque converter is monitored indirectly or directly as another operational variable.

On the one hand, the internal pressure can for example be measured easily in the torque converter using available, cost-effective pressure sensors, and on the other hand the internal pressure is a reliable indication as to whether the converter lockup clutch can still be reliably closed. A typical value of the internal pressure is generally known a priori or is generated during the vehicle operation which makes reliable engagement of the converter lockup clutch impossible, which is to be prevented.

In one advantageous refinement of the device it is proposed that the rotational speed ratio of the turbine wheel with respect to the pump wheel be monitored indirectly or directly as another operational variable.

By monitoring the rotational speed ratio of the turbine wheel with respect to the pump wheel it is possible, without having to explicitly measure the internal pressure in the converter, to reliably determine whether the converter lockup clutch is closed or can be closed. On the other hand, the relationship between the rotational speed ratio and the internal pressure in the torque converter is known and is stored, for example in a characteristic diagram, so that the internal pressure above which the converter lockup clutch can no longer be closed can be determined by means of the relative rotational speed.

Measuring the respective rotational speed of the pump wheel and turbine wheel of the torque converter, transmitting the resulting measured variables, evaluating them and determining their relative rotational speeds and then monitoring those speeds can be done just as easily as the monitoring of the internal pressure in the torque converter. In addition, in most cases the rotational speeds of the pump wheel and turbine wheel are required, and thus already present, in at least one open-loop or closed-loop control unit, usually in the transmission open-loop or closed-loop control unit, for other open-loop or closed-loop control routines.

According to a further embodiment of the invention, the inclination of the underlying surface is monitored indirectly or directly as another operational variable. This is advantageous, in particular, for an early detection of an inclination of the underlying surface. The inclination of the underlying surface correlates in overrun conditions with torque loading of the converter lockup clutch and thus with the need for a particular closing pressure. According to the invention, by monitoring the inclination of the underlying surface measures can be taken in good time which keep the converter lockup clutch closed or close it and avoid undesired acceleration of the motor vehicle.

The inclination of the underlying surface can be determined, for example by means of the driving resistance. Information about this is already present, for example, in the engine open-loop or closed-loop control unit in order, for example, to set the optimum mixture formation. It is also conceivable for data from geo-satellites (GPS, global positioning system; Galileo), data from a digital map which is carried in the motor vehicle or from sensor values to be evaluated in order to determine the inclination of an underlying surface, and, if appropriate, its magnitude.

In one embodiment of the invention, the aforesaid operational variables are not only determined and evaluated individually but in combination, as a result of which the reasonability of individual operational variables can be checked and determined simultaneously, whereby incorrectly triggered measures can largely be avoided.

It is advantageous if, the monitored operational variable correlates with the gradient of the change in the rotational speed ratio of the turbine wheel with respect to the pump wheel. From this it is possible to determine the degree of urgency of the change in the engine speed or the transmission ratio which may need to be performed and to initiate the change immediately or gradually, which constitutes an improvement in the driving comfort and contributes to safety.

It is also advantageous if the monitored operational variable or the operational variables are monitored taking into account at least one previous gear shifting process, since the respective parameters of successive gear shifting processes can be compared, differences which originate, for example, from wear can be indicated and open-loop and closed-loop control routines can be correspondingly adapted in order to keep the driving behavior of the motor vehicle essentially constant over a long time period and maintain a high level of driving comfort.

In addition to the slowly occurring changes which are caused, for example, by wear or ageing of the hydraulic medium, quickly occurring changes are also perceptible, these being caused by comparatively short-term influences. For this reason, it is particularly advantageous if the monitored operational variable or the monitored operational variables correspond to the (current) closing behavior of the converter lockup clutch.

The closing behavior of the converter lockup clutch is, similar to the closing behavior of a starting clutch, subject to environmental influences and thus dependent on environmental parameters, in particular on the temperature and air humidity, since such influences, inter alia, have effects on the viscosity and the lubrication properties of the hydraulic medium. If only operational variables which correlate with the closing behavior of the converter lockup clutch are monitored, open-loop and closed-loop control processes can be adapted to the conditions which are changed as a result of this and the resulting influences can thus be largely compensated.

A particularly simple method is obtained, if, on the one hand, the rotational speed ratio is reduced by changing the engine speed or the transmission ratio as soon as the operational variable exceeds a predefined threshold value which is dependent on a characteristic diagram or adapted during operation and, on the other hand, the transmission ratio which was set before changing the engine speed of the continuously variable transmission are set again when the operational variable drops below a second threshold value. It is possible here to use a simple comparison without complicated open-loop or closed-loop control as a triggering criterion.

The invention will become more readily apparent from the following description of an exemplary embodiment thereof on the basis of the accompanying drawings:

DESCRIPTION OF A PREFERRED EMBODIMENT

Figure 1:
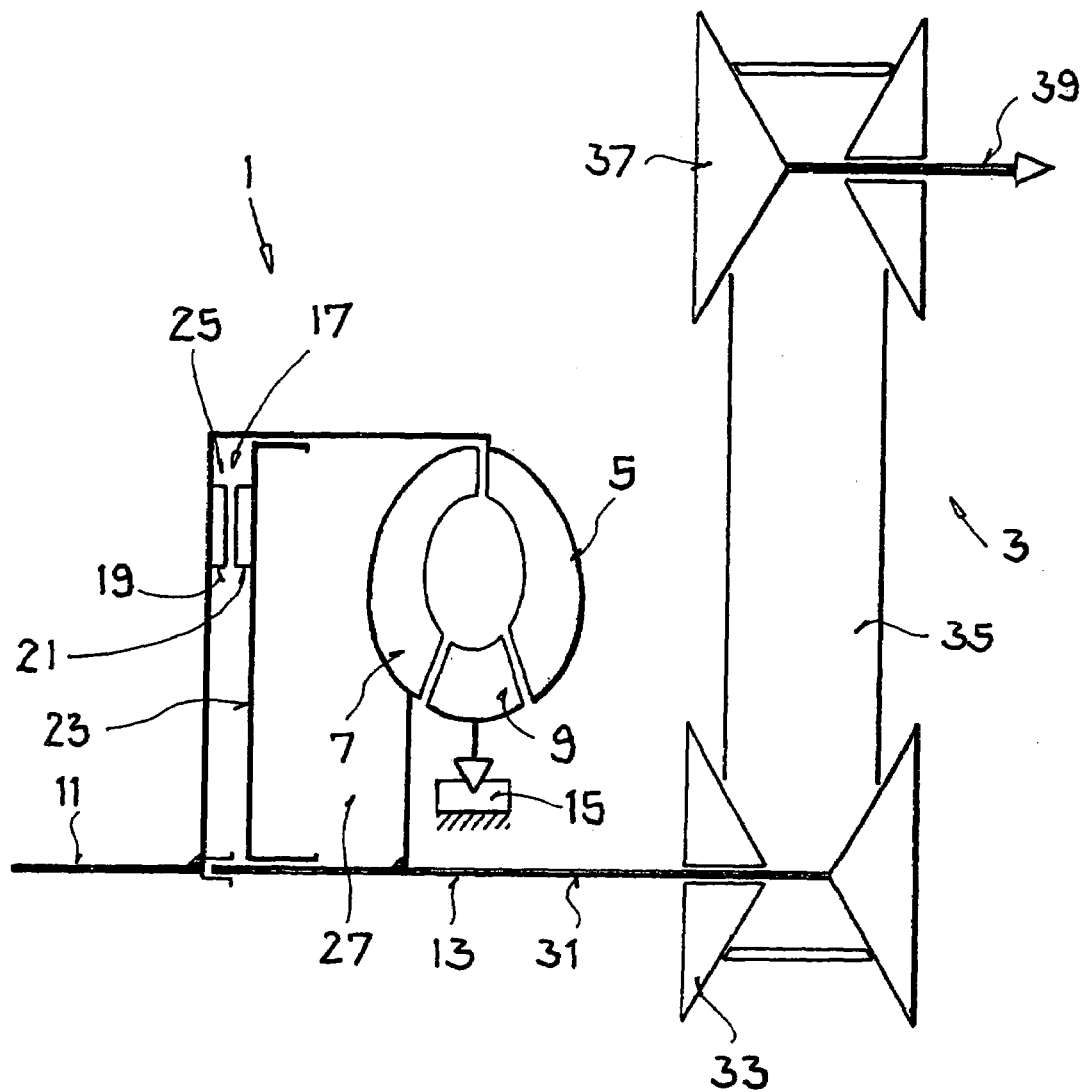
FIG. 1 is a schematic illustration of a torque converter with a converter lockup clutch and continuously variable transmission, and FIGS. 2 a–d are diagrams each representing a number of the operational data items which are relevant for the method according to the invention, with respect to time.

The invention is suitable in particular for operating a torque converter with a converter lockup clutch in conjunction with a mechanical, in particular continuously variable, transmission.

FIG. 1 shows a hydrodynamic torque converter 1 of a two-channel design and a continuously variable transmission 3 as parts of a drive train for a motor vehicle. The torque converter 1 has, in a known fashion, a converter housing (not illustrated) and a pump wheel 5 in a housing interior 25, said pump wheel 5 being connected fixed in terms of rotation to an input shaft 11 which is driven by a drive motor (not illustrated), and a turbine wheel 7 which is connected fixed in terms of rotation to a hub or turbine shaft 13, and a stator 9 which is supported by means of a freewheeling clutch 15 on, for example, a stator shaft (not illustrated). A torsion oscillation damper (not illustrated) is usually connected in the force flux between the pump wheel 5 and the turbine shaft 13. The pump wheel 5, turbine wheel 7 and stator 9 form a hydrodynamic working circuit in the torque converter 1.

The pump wheel 5 and turbine wheel 7 are connected to one another by means of a hydraulically engageable and disengageable converter lockup clutch 17, for example of the multiplate design or, as illustrated with two friction linings 19, 21 disposed opposite one another, in order to bypass the torque converter 1. The friction lining 19 is arranged nondisplaceably with respect to the converter housing and in a rotationally fixed fashion with respect to the pump wheel 5, and the friction lining 21 is arranged on an axial piston 23.

The axial piston 23 is mounted in an axially displaceable and pressure-tight fashion in the working pressure chamber 27 and fixed in terms of rotation with respect to the turbine wheel 7. The working pressure chamber 27 and housing interior 25 form pressure medium spaces which act on the axial piston 23 on opposite sides. The surface of the axial piston 23 facing away from the working pressure chamber 27 is connected hydraulically to the working circuit of the torque converter 1.

In order to close the converter lockup clutch 17, a working pressure is built up in such a torque converter 1 by means of a pressure duct which extends through the turbine shaft 13 which is a hollow shaft and in the working pressure chamber 27 by reversing the direction of flow of the fluid in the torque converter 1, said working pressure displacing the axial piston 23 in the axial direction and closing the converter lockup clutch 17 by pressing the displacably mounted piston 23 with the friction lining 21 against the nondisplaceably mounted friction lining 19.

The turbine shaft 13 is connected fixed in terms of rotation to a drive shaft 31 of the continuously variable transmission 3. Associated with the continuously variable transmission 3 are primary disk 33, 34, which take up the torque of the drive shaft 31, a transmission element 35, which passes on the torque to a secondary disks 37, 38, and a driven shaft 39 which is connected fixed in terms of rotation to the secondary disk 37, 38. For example, the primary and secondary disks 33, 34, 37, 38 are conical disks which are arranged in pairs, and the transmission element 35 is, for example, a wraparound element such as a push- or pull-type frictional engagement chain.

In place of the wraparound chain mechanism described here, for example a toroidal transmission or a planetary set with two drive elements which can be operated independently of one another and an output element are suitable as the continuously variable transmission 3. An open-loop and/or closed-loop control unit in which the method according to the invention is implemented and which controls and monitors the entire drive train or parts by an open-loop or closed-loop control circuit.

A further transmission, in particular a planetary gear mechanism may be connected as a reversing gear train between the torque converter 1 and the continuously variable transmission 3 or downstream of the continuously variable transmission 3.

During operation, a hydrodynamic working circuit is formed in the housing interior 25 in a known fashion, as a result of which an internal pressure is produced in all of the interior of the torque converter 1. This internal pressure acts on the axial piston 23 and thus counteracts the working pressure of the converter lockup clutch 17. The working pressure is dimensioned in such a way that during the normal driving mode it is greater than the internal pressure in the housing interior 25 in order to be able to reliably close the converter lockup clutch 17.

In specific types of torque converters 1, in particular in two-channel converters, an increased internal pressure occurs in the housing interior 25 in overrun conditions when a high negative torque is being transmitted (the turbine wheel 7 rotates more quickly than the pump wheel 5), and the increased internal pressure can lead to a situation in which, in rare cases, the converter lockup clutch 17 can no longer be closed (as is described in detail, for example, in the German laid-open patent application DE 101 47 207 A1).

So that this case can be excluded and the converter lockup clutch 17 can be closed reliably in every operating situation, according to the invention at least one operating variable of the motor vehicle is monitored and if the operating variable exceeds or has exceeded a threshold value, the rotational speed ratio of the pump wheel 5 and turbine wheel 7 is reduced by a higher engine speed and/or by a lower transmission ratio of the transmission 3.

For example the internal pressure in the housing interior 25, the relative rotational speed between the pump wheel 5 and turbine wheel 7, the gradient or inclination of the underlying surface or the transmission ratio are suitable as an operational variable to be monitored. According to other proposals of the invention, the operational variable to be monitored correlates, for example, with the gradient of the change in the relative rotational speed between the pump wheel 5 and turbine wheel 7, with the state of wear of the converter lockup clutch 17 or with its (previous) closing behavior. The monitored operational variable can additionally be monitored by taking into account at least one previous gear shifting process.

In the present exemplary embodiment, the (converter) rotational speed ratio between the turbine wheel 7 and the pump wheel 5 of the torque converter 1 is monitored as an operational variable.

FIGS. 2a–d show, plotted against respective time axes 41, 43, 45 and 71, a curve 47 of the pump rotational speed 49 (corresponds to the engine speed) in FIG. 2a, and a curve 51 of the (turbine) rotational speed 53 of the turbine wheel 7 (FIG. 1), and in FIG. 2b a curve 55 of the (converter) rotational speed ratio 57 of the rotational speed of the turbine wheel 7 and the rotational speed 47 of the pump wheel 5 in the torque converter 1 (FIG. 1), and in FIG. 2c a curve 59 of the transmission ratio 61 of the continuously variable transmission 3, and in FIG. 2d a curve 73 of the speed 71 of the vehicle.

The converter rotational speed ratio 57 as a monitored operational variable reliably provides information as to whether the pressure ratios in the housing interior 27 (FIG. 1) of the torque converter 1 permit the converter lockup clutch 17 to close without the internal pressure in the torque converter 1 having to be explicitly measured for this information.

The method according to the invention starts at a time $t_2$ when a speed threshold of, for example, 30 km/h has been exceeded and the algorithm for closing the converter lockup clutch 17 is started, and ends at a time $t_7$ when the driver's request is again implemented.

The speed threshold of approximately 30 km/h is predefined by the driving strategy. Below this speed threshold the converter lockup clutch 17 is not intended to be closed since this could lead to decreases in comfort, for example when traveling on the flat (a gradient of the roadway cannot be detected when the vehicle is stationary).

At a time $t_0$, the motor vehicle is traveling in traction mode; the pump wheel rotational speed 49 according to the curve 47 has a specific starting value 63 and the turbine wheel rotational speed 53 according to the curve 51 has a specific starting value 65, the converter rotational speed ratio 57 as a quotient of the turbine wheel rotational speed 51 and the pump wheel rotational speed 47 has a specific starting value 67 which is greater than one in overrun conditions, and the transmission ratio 61 according to the curve 59 has a specific starting value 69 and the speed 71 according to the curve 73 has a specific starting value 75 (more than 30 km/h).

Up to a time $t_1$ and beyond the pump wheel rotational speed 49 according to the curve 47 decreases quickly because the pedal value of an accelerator pedal is returned to zero by the driver. The turbine wheel rotational speed 53 according to the curve 51 is, on the other hand, reduced less quickly—in association with the speed 71 according to the curve 73—since the vehicle has a certain inertia owing to its mass which counteracts abrupt deceleration; the converter rotational speed ratio 57 according to the curve 55 thus increases and has a value 77 at the time $t_1$ at the changeover from the traction mode to the overrun conditions which is equal to one; the transmission ratio 61 according to the curve 61 remains constant in this time.

When the pump wheel rotational speed 49 decreases severely according to the curve 47 and the turbine wheel rotational speed 53 decreases less severely according to the curve 51, the converter rotational speed ratio 57 according to the curve 55 continues to increase after the time $t_1$. At the time $t_2$, according to the driving strategy the converter lockup clutch 17 will be closed (FIG. 1), the fluid flow direction in the torque converter 1 is reversed and the clutch 17 has pressure applied to it. Owing to the flow conditions in the torque converter 1, the closing process is however not readily possible since the increased internal pressure in the housing interior 25 counteracts the working pressure of the converter lockup clutch 17 in the working pressure chamber 27.

Since on the one hand the speed 73 of the vehicle according to the curve 71 is greater than the speed threshold of approximately 30 km/h which is predefined by the driving strategy, and, on the other hand, the converter rotational speed ratio 57 according to the curve 55 has a value 79 and has thus already exceeded a first threshold value 89, for example 1.08, the transmission ratio 61 according to the curve 59 is immediately set to a lower value 81 at the time $t_2$ in order to be able to close the converter lockup clutch 17 again and avoid undesired and dangerous acceleration of the vehicle on a negative gradient.

This reduction in the transmission ratio 61 takes place at the continuously variable transmission 3 (FIG. 1) up to a time $t_3$ or $t_4$ according to the curve 59 in a plurality of small intermediate steps which cannot be perceived by the driver or the vehicle occupants. Alternatively, the reduction in the transmission ratio 61 may take place continuously or in one jump to a predetermined level.

If the converter rotational speed ratio 57 according to the curve 55 drops below a second threshold value 91, for example 1.02, at a later time $t_5$, the process of connecting the converter lockup clutch 17 (FIG. 1) by the algorithm is considered to be terminated.

At a later time $t_6$, the transmission ratio 61 is changed according to the curve 59 and up to the time $t_7$ a higher transmission ratio, corresponding to the driver's request, is set in small increments, continuously or in one jump.

At the later time $t_7$, a predefined setting of the turbine wheel rotational speed 53, which has the intention of bringing about an engine braking effect and normally results from the driving strategy, is implemented again. Furthermore, a possible slight raising of the pump wheel rotational speed 49 is cancelled. From this time $t_7$, the engine braking effect which is caused for example by switching off the thrust and other measures then starts.

Since the braking effect of the engine is transmitted fully to the turbine wheel 7 via the closed converter lockup clutch 17 (FIG. 1), and to the drive wheels of the vehicle via the transmission 3, the case in which the vehicle rolls downhill on a negative gradient without a braking effect of the engine and is also accelerated in the process is excluded.

Additionally or alternatively to the intended change in the transmission ratio shown in this exemplary embodiment it is possible for the engine speed to be changed and slightly raised. For this purpose, a set point/idling flag is generally transmitted from the open-loop and/or closed-loop control unit for the transmission to the engine open-loop controller, in response to which the latter brings about an increase in the engine speed to, for example, 900 rpm.

This method which is proposed according to the invention has a higher priority as far as the minimum rotational speed of the engine and the transmission ratio is concerned than the request of the driver which he expresses by the position of the accelerator pedal and by the position of the gear selector lever. Since the method according to the invention takes up only a short time, the request of the driver can be implemented again quickly after completion of the automatic procedure.

What is claimed is:

1. A method for operating a drive train for a motor vehicle, having a drive engine, said drive train including a mechanical transmission with an operating piston (23), and a hydrodynamic torque converter (1) with a pump wheel (5) and a turbine wheel (7) disposed in the drive train ahead of the transmission, the torque converter (1) having a converter lockup clutch (17) which acts between the pump wheel (5) and turbine wheel (7) and can be closed by means of a working pressure acting on the operating piston (23), and an increased internal pressure, which also acts on the operating piston (23) and counteracts the working pressure of the converter lockup clutch (17), and which is produced in the torque converter (1) under overrun conditions, said method comprising the steps of: monitoring at least one operational variable of the motor vehicle while the converter lockup clutch (17) is closing, reducing the rotational speed ratio (55, 57) of the turbine wheel (7) with respect to the pump wheel (5) in accordance with the operational variable by changing one of the engine speed and the transmission ratio (59, 61), and monitoring the transmission ratio (59, 61) (indirectly or directly) as an operational variable.

2. The method as claimed in claim 1, wherein the internal pressure in the torque converter (1) is monitored as another operational variable.

3. The method as claimed in claim 1, wherein the rotational speed ratio (55, 57) of the turbine wheel (7) with respect to the pump wheel (5) is monitored as another operational variable.

4. The method as claimed in claim 1, wherein the gradient of the underlying surface is monitored as another operational variable.

5. The method as claimed in claim 1, wherein a monitored operational variable, correlates with the gradient of the change in the rotational speed ratio (55, 57) of the turbine wheel (7) with respect to the pump wheel (5).

6. The method as claimed in claim 1, wherein a monitored operational variable, correlates with the closing behavior of the converter lockup clutch (17).

7. The method as claimed in claim 1, wherein the operational variable is monitored taking into account at least one previous gear shifting process.

8. The method as claimed in claim 1, wherein, if the operational variable exceeds a first threshold value (89), the rotational speed ratio (55, 57) of the turbine wheel (7) with respect to the pump wheel (5) is reduced by changing at least one of the pump wheel rotational speed (47, 49) and the transmission ratio (59, 61).

9. The method as claimed in claim 8, wherein, when the first threshold value (89) is exceeded the transmission ratio (59, 61) of the transmission (3) is reduced, and/or the pump wheel rotational speed (47, 49) is increased, in such a way that the operational variable or the rotational speed ratio (55, 57) of the turbine wheel (7) with respect to the pump wheel (5) drops below a second threshold value (79).

10. The method as claimed in claim 1, wherein, when the operational variable drops below a second threshold value (91), the original transmission ratio (59, 61) of the transmission (3) and/or the original pump wheel rotational speed (47, 49) are reset.

11. The method as claimed in claim 1, wherein the mechanical transmission is a continuously variable transmission.

* * * * *